United States Patent [19]
Mirville

[11] Patent Number: 5,176,508
[45] Date of Patent: Jan. 5, 1993

[54] TURBOPUMP SYSTEM FOR DRIVING A PLURALITY OF PUMPS

[75] Inventor: Francois J. P. Mirville, Melun, France

[73] Assignee: Societe Nationale d'Etude et de Construction de Moteurs d'Aviation, Paris, France

[21] Appl. No.: 736,586

[22] Filed: Jul. 26, 1991

[30] Foreign Application Priority Data

Jul. 26, 1990 [FR] France .............................. 90 09555

[51] Int. Cl.⁵ .............................................. F04B 17/00
[52] U.S. Cl. .................................... 417/409; 417/406; 60/259; 60/268
[58] Field of Search .................. 417/406, 409; 60/259, 60/268, 39.162

[56] References Cited

U.S. PATENT DOCUMENTS

| | | |
|---|---|---|
| 2,816,417 | 12/1957 | Bloomberg . |
| 2,839,005 | 6/1958 | Means . |
| 4,155,684 | 5/1979 | Curiel et al. .......................... 417/409 |

FOREIGN PATENT DOCUMENTS

| | | |
|---|---|---|
| 2416057 | 10/1975 | Fed. Rep. of Germany ........ 60/259 |
| 1146347 | 3/1969 | United Kingdom . |

OTHER PUBLICATIONS

French Search Report (Apr. 19, 1991).

*Primary Examiner*—Richard A. Bertsch
*Assistant Examiner*—Laleh Jalali
*Attorney, Agent, or Firm*—Bacon & Thomas

[57] ABSTRACT

A turbopump system for pumping two separate fluids is disclosed having a pair of concentric turbine rotors located within a turbine casing, each directly connected to a pump impeller. The centrifugal pumps, which may be located on opposite sides of the turbine casing are separately connected to their respective fluids such that the two fluids may be pumped simultaneously. A propellant fluid is directed through a generally annular space defined between the concentric turbine rotors to rotate them in opposite directions. Turbine blades attached to each of the turbine rotors extend into this annular space in order to drive the turbine rotors. The pitches of the turbine blades are such that the rotors are driven in opposite directions and one of the turbine rotors may be driven at a different speed than the other.

11 Claims, 3 Drawing Sheets

TURBOPUMP SYSTEM FOR DRIVING A PLURALITY OF PUMPS

BACKGROUND OF THE INVENTION

The present invention relates to a turbopump system for driving a plurality of pumps. The system finds particular application in the driving of a pair of centrifugal pumps to pump two separate propellant fluids into a rocket engine combustion chamber.

Many technical applications require the simultaneous pumping of two separate fluids, such as a rocket engine wherein the liquid fuel and oxidizer must be fed into a combustion chamber. Typically, these applications require matching the capacities and the speeds of the two pumps to the type of fluid which is being pumped and to the required pressure increase in order to achieve optimal efficiency of the two fluid pumping system while maintaining a minimal weight. It has been suggested to size the pumps so that they may be driven at the same speed using a single turbine as a power source. In this system, the pumps and the turbine rotor are rigidly linked by a single shaft. This design does not enhance the overall efficiency of the system, since the operating efficiency of each component (the two pumps or the turbine) cannot be optimized by using a single speed.

While it is possible to drive the two pumps at different speeds using a single turbine by interposing a speed reducer between the turbine and one of the pumps, this increases the weight and bulk of the system, as well as increasing the vibration of the system. Obviously, each of the pumps may be separately driven by its own turbine. Equally obviously, this design increases the weight and bulk of the system and is, therefore, undesirable.

SUMMARY OF THE INVENTION

A turbopump system for pumping two separate fluids is disclosed having a pair of concentric turbine rotors located within a turbine casing, each directly connected to a pump impeller. The centrifugal pumps, which may be located on opposite sides of the turbine casings are separately connected to their respective fluids such that the two fluids may be pumped simultaneously. A propellant fluid is directed through a generally annular space defined between the concentric turbine rotors to rotate them in opposite directions. Turbine blades attached to each of the turbine rotors extend into this annular space in order to drive the turbine rotors. The pitches of the turbine blades are such that the rotors are driven in opposite directions and one of the turbine rotors may be driven at a different speed than the other. This enables the system efficiency to be maximized by rotating each of the pump impellers at a speed which maximizes its individual efficiency with the specific liquid being pumped. No undue weight or bulk is entailed by this system, since both the turbine rotors are driven by a single propellant fluid.

The turbopump system according to the present invention obviates the drawbacks of the known systems by providing a counter-rotating turbine having concentrically arranged turbine rotors, each of which are directly attached to a pump impeller. The turbine rotors may be rotated at different speeds with, preferably, the radially inner-most turbine rotor being rotated at a higher speed than the radially outer-most turbine rotor. The axis of rotation of the turbine rotors may be coincident with the axes of rotation of each of the pump impellers.

The system according to the invention provides increased efficiency since the rotational speeds of each pump can be matched to the specific type of fluid being pumped and to the desired pressure difference. The efficiency is also maximized by the absence of any fixed guide vanes between the turbine blades of the turbine rotors. The turbine blades are located axially adjacent to each other and, if a plurality of blade stages are used for each turbine rotor, the blades may be interleaved in an axial direction. The present system also eliminates the need for any speed-reducing device as in the known systems.

The dimensions of the counter-rotating turbine rotors, as well as the geometry of the turbine blades may be calculated in relation to the respective powers and speeds of the two pumps, and as a function of the propellant fluid used to drive the turbine rotors.

The turbine casing may define an intake manifold for the propellant fluid as well as an exhaust manifold for exhausting it after it passes over the turbine blades. Alternatively, the propellant fluid inlet may be defined by one of the pump impellers.

DETAILED DESCRIPTION OF THE PREFERRED EMBODIMENTS

Figure 1:
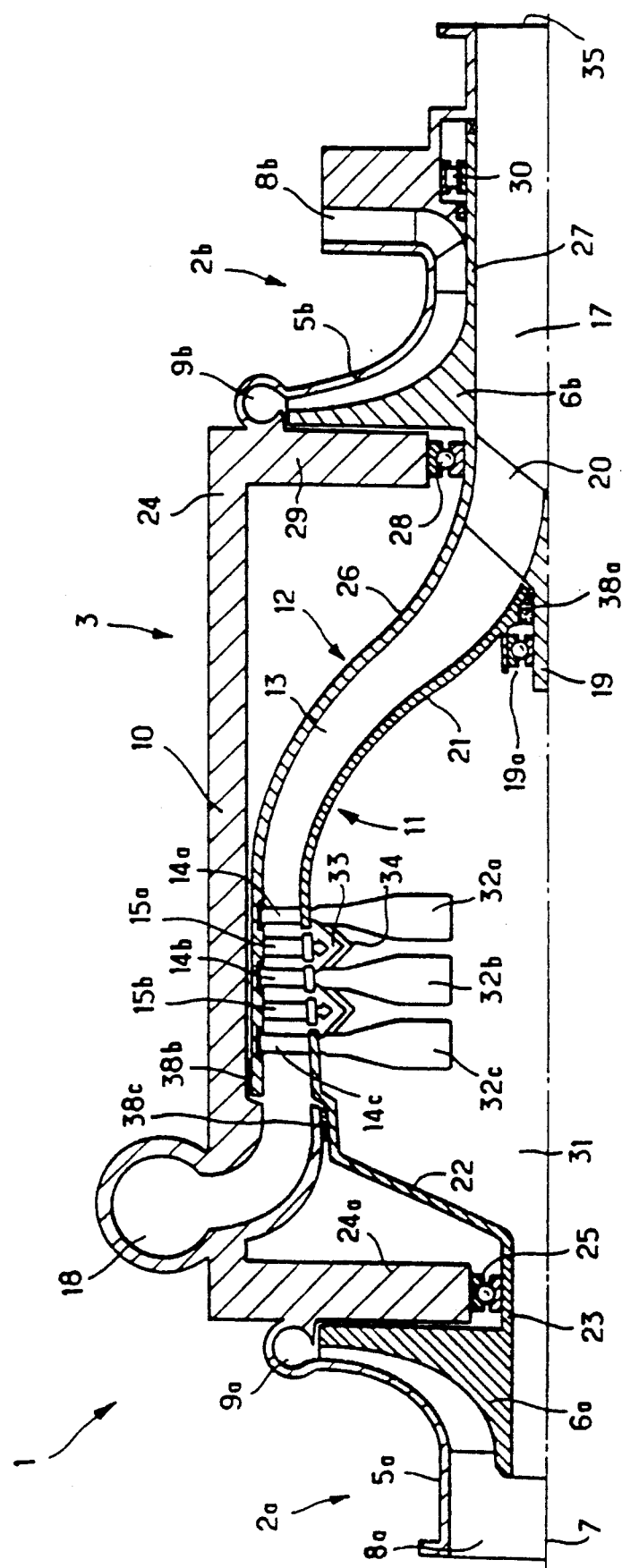
FIG. 1 is a partial, longitudinal cross-sectional view of a preferred embodiment of the turbopump system according to the present invention.

The turbopump system according to the present invention is illustrated at 1 in FIG. 1 and may be used to simultaneously pump two liquid propellants into a rocket engine combustion chamber. Although the invention will be described in conjunction with this usage, quite obviously, it may be used in any system in which it is desired to simultaneously pump two separate liquids. The turbopump system 1 comprises two coaxial centrifugal pumps 2a and 2b which may be driven at different speeds by a counter-rotating turbine 3 whose axis of rotation is coaxial with that of pumps 2a and 2b.

The first centrifugal pump 2a comprises an external stationary casing 5a as well as an impeller 6a. The impeller 6a is located within the casing 5a and is rotatable about axis 7 which is common to pumps 2a, 2b and the turbine 3. Rotation of the impeller 6a will pump a first fluid through the intake orifice 8a of the pump 2a and out a discharge manifold 9a formed by the casing 5a. In the embodiment shown in FIG. 1, the intake orifice 8a is also coaxial with axis 7.

Similarly, second centrifugal pump 2b comprises a stationary casing 5b and an impeller 6b. The impeller 6b is located within the casing 5b and is rotatable about axis 7 in order to pump a second fluid from an intake orifice 8b and out a discharge manifold 9b formed in the casing 5b. The two centrifugal pumps 2a and 2b are located at opposite sides of the counter-rotating turbine 3.

The counter-rotating turbine 3 comprises an essentially cylindrical stationary casing 10 which interconnects the casings 5a and 5b of the centrifugal pumps 2a and 2b. Located within the stationary casing 10 are concentrically arranged turbine rotors 11 and 12 which rotate in opposite directions about the common axis 7.

The inner rotor 11 is located radially closer to the axis than is outer rotor 12, and is directly connected to the impeller 6a of the first pump 2a by shaft 23. The outermost rotor 12 encloses at least a portion of the inner rotor 11 and is directly connected to the impeller 6b of the second pump 2b by shaft 27. The inner rotor 11 and the outer rotor 12 define a generally annular space 13 between them, at least a portion of which is coaxial with the common axis 7. Each of the rotors 11 and 12 has at least one stage of turbine blades 14 and 15 extending into the annular space 13. While any number of blade stages may be utilized, it is preferred that the number of blade stages on the turbine rotors 11 and 12 are the same, or differ at most by one stage. As illustrated in FIG. 1, inner rotor 11 utilizes three blade stages 14a, 14b and 14c, while the outer rotor 12 has two stages denoted by 15a and 15b. Blade stages 14a, 14b and 14c of the inner rotor 11 axially alternate with the blade stages 15a and 15b of the outer rotor 12 such that the blade stages are interleaved. As is well known in the art, the blade stages comprise turbine blades which are circumferentially distributed about and extend in a radial direction from the turbine rotors.

The turbine rotors 11 and 12 can be rotated about the axis 7 by expanding a propellant fluid into the annular space 13 through a propellant fluid supply duct 17. The propellant fluid, after passing across the blade stages 14 and 15 exits through exhaust manifold 18 defined by the turbine casing 10. As illustrated in FIG. 1, the propellant fluid supply duct 17 is located on the side of the turbine adjacent to the second pump 2b, while the exhaust manifold 18 is located adjacent to the first pump 2a.

The inner rotor 11 is mounted within the outer rotor 12 by a support member 19 having a ball bearing 19a operatively interposed between the support member 19 and a portion of the turbine rotor 11. Support member 19 is attached to the outer rotor 12 by a plurality of generally radially extending support arms 20. Support arms 20 may have an airfoil shape and may deflect the flow of the propellant fluid entering the annular space 13. As illustrated, the support arms 20 extend radially into the annular space 13. Preferably, the average diameter of the annular space 13 decreases as it approaches the propellant supply duct 17 to provide a smooth transition for the propellant fluid.

The inner turbine rotor 11 has a conical section 21 located between the ball bearing 19a and the first blade stage 14a. It also has a conical section 22 downstream of the last blade stage 14b linking the rotor 11 to the shaft 23 of the impeller 6a. Ball bearing 25 rotatably supports this end of the inner rotor 11 on wall 24a of the turbine casing 10. The stationary turbine casing 10 may be formed by a structure 24 which also integrally includes pump casings 5a, 5b as well as the turbine casing 10.

Similarly, outer rotor 12 has a conical section 26 extending between the shaft 27 of the impeller 6b to the first blade stage 15a. The outer rotor 12 is mounted within the stationary structure 24 by ball bearing 28 located between the outer rotor 12 and wall 29 of the stationary structure, as well as by a roller bearing 30 located between the pump shaft 27 and the stationary casing 5b. As can be seen, the downstream end of the outer rotor 12 is supported in cantilever fashion by the bearing assemblies 28 and 30.

The conical portions 21 and 22 define a space around the axis 7 of sufficient size to house turbine discs 32a, 32b and 32c, each respectively bearing the turbine blade stages 14a, 14b and 14c. The discs 32a, 32b and 32c are sufficiently large to withstand the substantial centrifugal forces exerted thereon due to the higher speed rotation of inner rotor 11. Accordingly, the first pump 2a rotates faster than does pump 2b. Adjacent discs are connected to each other in known fashion by conical walls defining, with the annular space 13, an annular zone 33 located in alignment with corresponding blade stages 15a and 15b, respectively. The annular zones 33 house annular discs 34 attached to the radially innermost ends of the blade stages 15a and 15b. The annular space 13 comprises the flow path for the propellant fluid and is sealed in known manner at the tips and roots of the turbine blades to ensure the continuity of the propellant fluid flow path.

As illustrated in FIG. 1, the intake orifice 8a of the first pump 2a is generally coaxial with the common axis 7.

The second pump 2b, which rotates more slowly than does the first pump 2a, may have an impeller 6b with a hollow, center opening along the axis 7 to comprise at least a portion of the propellant fluid supply duct 17. The supply duct 17 issues from the pump 2b through an aperture 35 defined by the casing 5b. In this instance, the intake orifice 8b for the second pump 2b is not in alignment with the axis 7.

Figure 2:
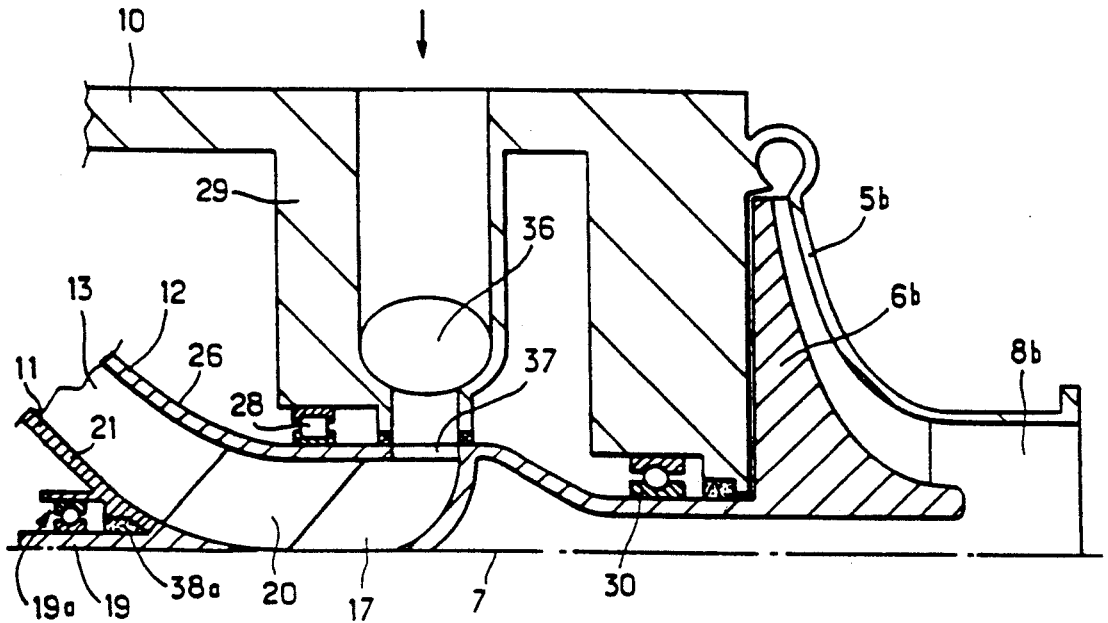
FIG. 2 is a partial, longitudinal cross-sectional view similar to FIG. 1 illustrating an alternative embodiment of the turbine propellant fluid intake.
Figure 3:
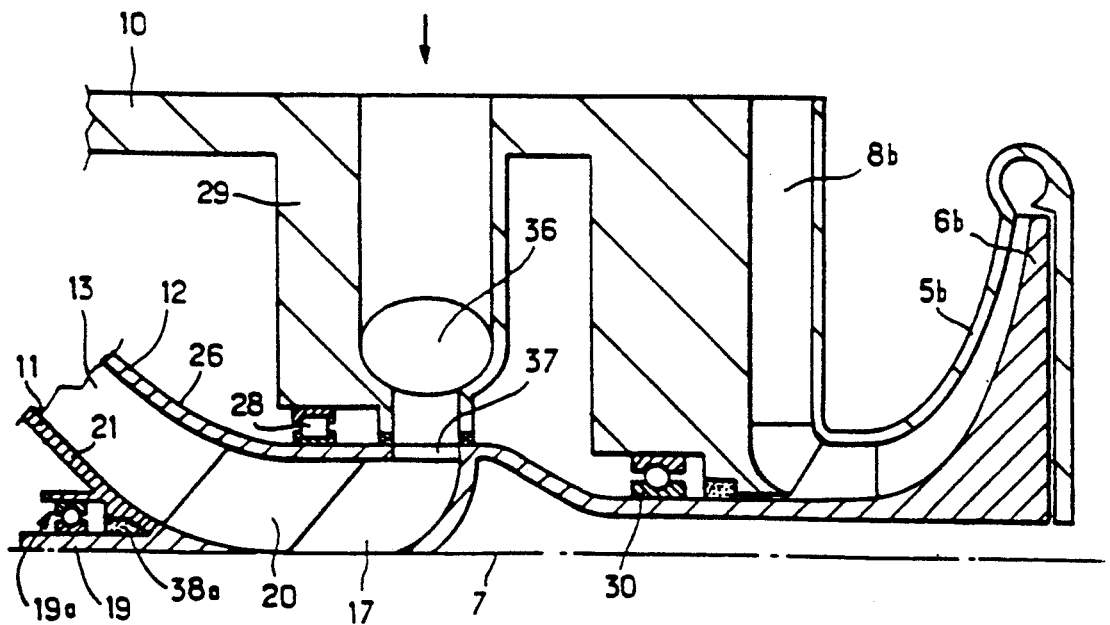
FIG. 3 is a partial, longitudinal cross-sectional view similar to FIG. 2 illustrating an alternative arrangement of the centrifugal pump.

In certain circumstances, due to the size constraints of the second pump 2b, the opening through the hub of the impeller 6b may be insufficient to provide an adequate flow of propellant fluid into the annular space 13. In this instance, the embodiments illustrated in FIGS. 2 and 3 may be utilized. These embodiments provide an annular intake manifold 36 for the propellant fluid, which manifold is defined by turbine housing 10. The intake manifold 36 communicates with the propellant fluid supply duct 17 through openings 37 defined by the turbine casing 10. Quite obviously, seals may be provided between the stationary portions of the turbine casing 10 and the rotating elements to prevent leakage of the propellant fluid.

Seals 38a, 38b and 38c are also provided between the turbine rotors 11 and 12, and the stationary portions of the system, such as turbine casing 10 and support member 19. The seals prevent undue leakage of the propellant fluid as it passes through the annular space 13. Pumps 2a and 2b are also equipped with known seals to isolate the fluids pumped by the pumps and to prevent leaks to the inside of the turbine casing 10.

Figure 4:
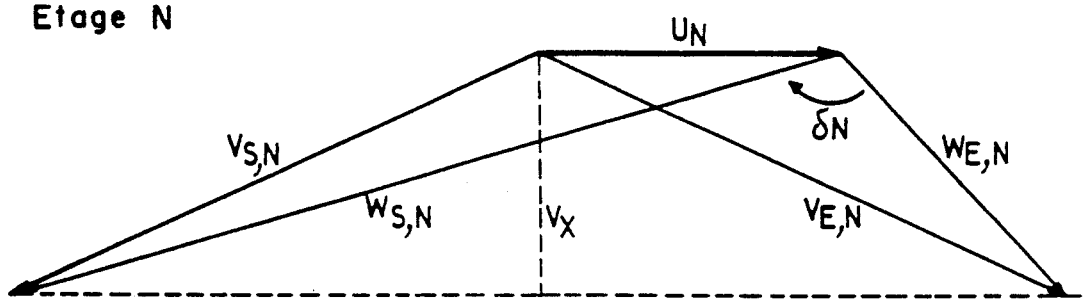
FIG. 4 is a schematic diagram of the speed vectors of a turbine blade located on the inner-most turbine rotor.
Figure 5:
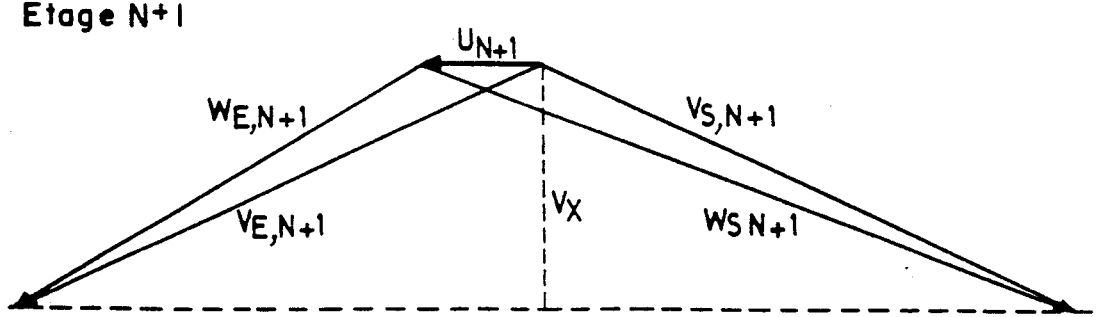
FIG. 5 is a schematic diagram of the speed vectors of a turbine blade located on the outer-most turbine rotor.

FIGS. 4 and 5 are schematic diagrams of the speed vectors of adjacent blade stages. Adjacent blades in stages 14a and 15a are illustrated in FIGS. 4 and 5, respectively. The tangential speeds of the blades $U_n$ and $U_{n+1}$ are in the ratio of mechanical modes of the turbine rotors 11 and 12, provided that the average radii of the two stages 14a and 15a are identical. For each blade stage 14a or 15a, the speed triangles are symmetric for intake and discharge speeds $V_E$ and $V_s$, respectively. The turbine blades are designed such that the axial speed $V_x$ is maintained constant for all of the blade stages.

In order to optimize the efficiency of the turbine, the value $V_x$ is selected so that the ratios of the axial speeds $V_x$ to the tangential speeds $U_n$ and $U_{n+1}$ are on either side of 1. In the example illustrated in FIGS. 4 and 5, this ratio may be approximately 0.77 for the blade stage 14a and approximately 2 for the blade stage 15a. The ratio of speeds $U_n$ to $U_{n+1}$ is approximately 3.

The shape of the support arms 20, which are rigidly attached to outer turbine rotor 12 is such that the propellant fluid moves through the intake toward the first blade stage 14a in the manner of an intake manifold of a conventional turbine. Because these support arms 20 are located near the rotational axis 7, they deliver much less power to the outer rotor 12 than do the blade stages 15a and 15b.

The number of blade stages for each turbine rotor may be calculated as a function of the propellant fluid to be utilized to drive the rotors 11 and 12. The use of hydrogen at high temperatures as a gaseous propellant fluid allows the achievement of a head pressure per blade stage which is much higher than for other fluids. As a result, the number of blade stages may be reduced for a given propellant flow and desired turbine power.

The foregoing description is provided for illustrative purposes only and should not be construed as in any way limiting this invention, the scope of which is defined solely by the appended claims.

I claim:

1. A turbopump system for pumping two separate fluids comprising:
    a) a first centrifugal pump having a first stationary housing defining a first fluid inlet and a first fluid outlet, and a first impeller located in the first housing so as to rotate about a first axis;
    b) a second centrifugal pump having a second stationary housing defining a second fluid inlet and a second fluid outlet, and a second impeller located in the second housing so as to rotate about the first axis;
    c) a stationary turbine casing interconnecting the first and second stationary pump housings;
    d) an inner turbine rotor located within the turbine casing so as to rotate about the first axis and operatively associated with the first impeller such that rotation of the inner turbine rotor causes rotation of the first impeller;
    e) an outer turbine rotor located within the turbine casing concentric with respect to the inner turbine rotor, the outer turbine being rotatable about the first axis and defining, with the inner turbine rotor a generally annular space extending about the first axis, the outer turbine rotor being operatively associated with the second impeller such that rotation of the outer turbine rotor causes rotation of the second impeller;
    f) at least one stage of first rotor blades attached to the inner turbine rotor and extending into the annular space;
    g) at least one stage of second rotor blades attached to the outer turbine rotor and extending into the annular space axially adjacent to the at least one stage of first rotor blades; and,
    h) means to supply a propellant fluid to the annular space so as to rotate the first and second turbine rotors in opposite directions.

2. The turbopump system of claim 1 wherein the first and second rotor blades are oriented such that the inner turbine and first pump impeller rotate at a higher speed than the outer turbine rotor and second pump impeller.

3. The turbopump system of claim 1 wherein the second impeller defines a supply duct communicating with the annular space to supply the propellant fluid to the annular space.

4. The turbopump system of claim 3 wherein the turbine casing defines an exhaust manifold communicating with the annular space to exhaust the propellant fluid therefrom.

5. The turbopump system of claim 4 wherein the exhaust manifold is located adjacent to the first centrifugal pump.

6. The turbopump system of claim 1 further comprising support means to rotatably support the inner and outer rotors in the turbine casing.

7. The turbopump system of claim 6 wherein the support means comprises:
    a) a support member;
    b) a plurality of arms attaching the support member to the outer turbine rotor;
    c) first bearing means operatively associated between the support member and the inner turbine rotor;
    d) second bearing means operatively associated between the inner turbine rotor and the turbine casing; and,
    e) third bearing means operatively associated between the outer turbine rotor and the turbine casing.

8. The turbopump system of claim 7 wherein the support means further comprises fourth bearing means operatively associated between the second impeller and the second pump housing.

9. The turbopump system of claim 1 wherein the turbine casing has opposite sides, and wherein the first and second centrifugal pumps are located on opposite sides of the turbine casing.

10. The turbopump system of claim 9 wherein the turbine casing defines a propellant fluid intake adjacent to the second centrifugal pump such that the fluid intake communicates with the annular space.

11. The turbopump system of claim 10 wherein the turbine casing defines a propellant fluid exhaust adjacent to the first centrifugal pump, such that the fluid exhaust communicates with the annular space.

* * * * *